United States Patent
Wuerfel et al.

(10) Patent No.: US 7,865,547 B2
(45) Date of Patent: Jan. 4, 2011

(54) SYSTEM AND METHOD FOR ACCESSING BUSY IP NETWORK RESOURCES

(75) Inventors: Randy Wuerfel, Santa Clara, CA (US);
Richard Crouch, Gustine, CA (US);
Michelle Michael, San Jose, CA (US)

(73) Assignee: Siemens Enterprise Communications, Inc., Boca Raton, FL (US)

(*) Notice: Subject to any disclaimer, the term of this patent is extended or adjusted under 35 U.S.C. 154(b) by 992 days.

(21) Appl. No.: 10/243,781

(22) Filed: Sep. 12, 2002

(65) Prior Publication Data

US 2004/0054714 A1 Mar. 18, 2004

(51) Int. Cl.
*G06F 15/16* (2006.01)

(52) U.S. Cl. .............. 709/203; 709/206; 709/217; 709/219

(58) Field of Classification Search ............. 709/203, 709/206, 217, 219
See application file for complete search history.

(56) References Cited

U.S. PATENT DOCUMENTS

| | | | |
|---|---|---|---|
| 5,995,848 A * | 11/1999 | Nguyen | 455/528 |
| 6,009,275 A * | 12/1999 | DeKoning et al. | 710/220 |
| 6,018,785 A * | 1/2000 | Wenniger | 710/200 |
| 6,223,046 B1 * | 4/2001 | Hamill-Keays et al. | 455/512 |
| 6,339,640 B1 * | 1/2002 | Chen et al. | 379/209.01 |
| 6,363,430 B1 * | 3/2002 | Thomas | 709/245 |
| 6,411,601 B1 * | 6/2002 | Shaffer et al. | 370/230 |
| 6,523,098 B1 * | 2/2003 | Anderson | 711/158 |
| 6,721,278 B1 * | 4/2004 | Rimhagen et al. | 370/252 |
| 6,731,937 B1 * | 5/2004 | Spinner | 455/445 |
| 6,760,594 B1 * | 7/2004 | Murasawa et al. | 455/512 |
| 6,799,208 B1 * | 9/2004 | Sankaranarayan et al. | 709/223 |
| 6,804,509 B1 * | 10/2004 | Okon et al. | 455/414.1 |
| 6,895,250 B1 * | 5/2005 | Igarashi | 455/459 |
| 6,981,259 B2 * | 12/2005 | Luman et al. | 718/103 |
| 7,027,814 B1 * | 4/2006 | Koivupuro et al. | 455/435.1 |
| 2002/0087678 A1 * | 7/2002 | Padilla | 709/223 |
| 2002/0150227 A1 * | 10/2002 | Abraham | 379/218.02 |
| 2002/0193119 A1 * | 12/2002 | Goss et al. | 455/453 |

* cited by examiner

*Primary Examiner*—Rupal D Dharia
*Assistant Examiner*—Van Kim T Nguyen

(57) ABSTRACT

An Accessing Busy Resources service is adapted to receive subscription requests from clients for notification of when a busy resource is free, and to monitor network resources to determine if they are free. Upon notification, the Accessing Busy Resources service de-subscribes the client. The network client devices include Access Request units which make requests to access services and receive notification when the services are available.

6 Claims, 4 Drawing Sheets

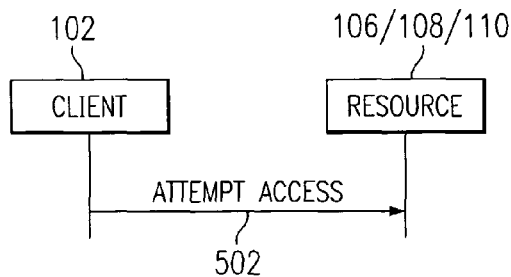
*FIG. 5A*
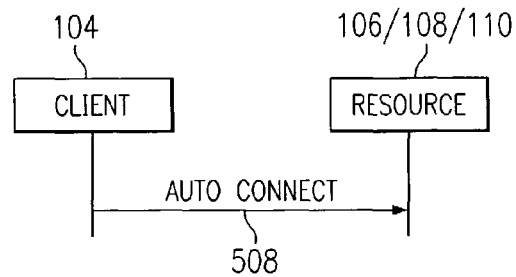
*FIG. 5C*
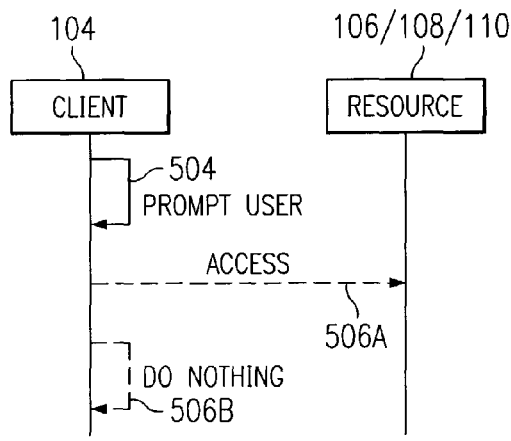
*FIG. 5B*
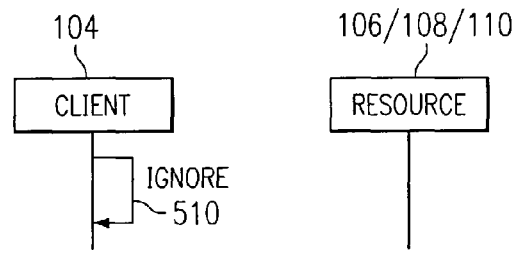
*FIG. 5D*
*FIG. 6*
| SUBSCRIBER ID | RESOURCE ID | PRIORITY | EXP | SUBSCRIBER CONDITION | SERVICE CONDITION |
|---|---|---|---|---|---|
| 602 | 604 | 606 | 608 | 610 | 612 |

SYSTEM AND METHOD FOR ACCESSING BUSY IP NETWORK RESOURCES

BACKGROUND OF THE INVENTION

The present invention relates to telecommunications systems and, in particular, to an improved system and method for determining the availability of network resources.

Telecommunications devices or clients in networks, such as Internet Protocol (IP) networks, share a variety of network resources. These include, for example, conferencing or MCU channels, gateway channels, media-on-hold ports, IVR ports, unified messaging ports, recorded announcements, media recording ports, DTMF detection ports, call parking slots, pilot numbers to applications, and the like.

As can be appreciated, high demand resources are occasionally not available when needed by a network device. In such cases, the client typically has one of two options. First, the client could randomly attempt to re-connect to the busy resource, and hope that it will soon become available. However, this method may be disadvantageous in that another client may access the resource first when it does become free.

Alternatively, the client may employ a "presence" feature, whereby the client subscribes to a particular network resource to be notified when the resource becomes available. However, when the resource becomes free, all parties waiting for that resource are notified simultaneously. Thus, it is possible even with a presence subscription for another client to gain access to the resource first. In addition, by subscribing to a particular network resource, the user is not able to take advantage of the resource becoming free at another instance of the resource. For example, if a client monitors for a free channel specifically at a Gateway A, then the client would not be aware that an equally good channel on Gateway B has become available, unless the client also subscribes to the Gateway B for presence.

These and other drawbacks in the prior art are overcome in large part by a system and method for accessing busy IP network resources according to embodiments of the present invention.

SUMMARY OF THE INVENTION

A telecommunications system according to an embodiment of the present invention includes a network, one or more client devices on the network, one or more network resources on the network, and an Accessing Busy Resources service. The Accessing Busy Resources service is adapted to receive subscription requests from clients for notification of when a busy resource is free, and to monitor network resources to determine if they are free. Upon notification, the Accessing Busy Resources service de-subscribes the client. The network client devices include Access Request units which make requests to access services and receive notification when the services are available.

A method according to an embodiment of the present invention includes sending a resource access request to a network resource; subscribing to an Access Busy Resources service if the resource is not available; and receiving messaging from the Accessing Busy Resources service when the resource becomes available.

A method according to another embodiment of the present invention includes receiving a subscription request for notification of when a busy resource is free; monitoring when one or more instances of the resource are free; determining a priority among clients that have subscribed for access to the resource; and notifying clients according to the priority when the resource is free.

An Accessing Busy Resources service according to an embodiment of the present invention includes a controller, a memory, and a network interface. The controller is adapted to receive subscription requests from network clients for monitoring of busy network resources via the network interface, and monitor the network for when the corresponding network resources are free. Further, the controller maintains a database of priorities as well as of multiple instances of the network resource. The controller can then advise the network clients, in order of priority, when the network resource is free.

A network client according to an embodiment of the present invention may be implemented as a network application or a network device. The network clients request access to network resources and subscribe to the Access Busy Resources service if the resource is unavailable. Upon receiving notification that the resource is free, network applications will attempt to access the resource. Network devices may prompt the user to inform him that the resource is free, autoconnect the user to the resource, or ignore the message.

A better understanding of these and other specific embodiments of the invention is obtained when the following detailed description is considered in conjunction with the following drawings.

BRIEF DESCRIPTION OF THE DRAWINGS

FIG. 5A-5D illustrate client actions upon receiving acknowledgement from the Access Busy Resources service according to embodiments of the present invention FIG. 6 is a diagram of an exemplary accessing request message according to an embodiment of the present invention;

DETAILED DESCRIPTION OF EMBODIMENTS OF THE INVENTION

Figure 1:
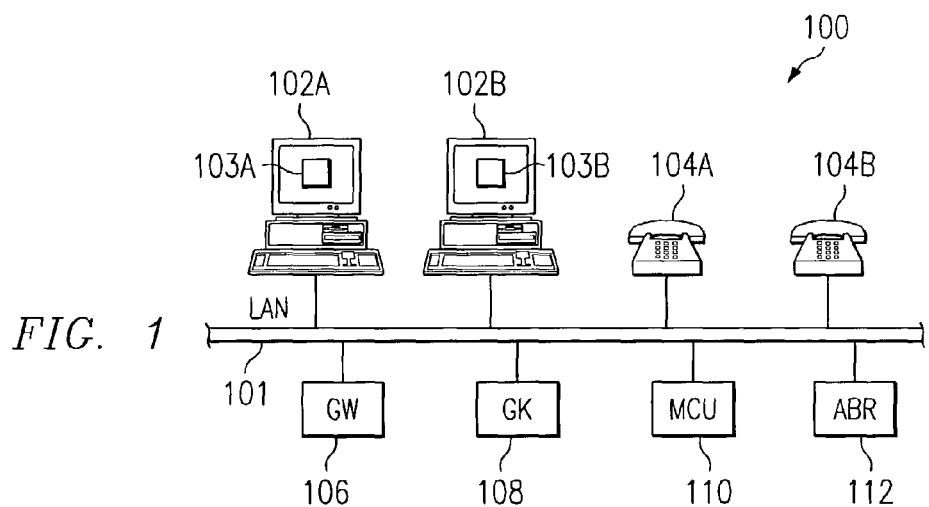
FIG. 1 is a diagram of a telecommunication system according to an embodiment of the present invention.

Turning now to the drawings and, with particular attention to FIG. 1, a diagram of a telecommunications system according to an embodiment of the present invention is shown.

In particular, a diagram illustrating an exemplary Internet Protocol (IP) telecommunications system and, particularly, an H.323 telecommunications system 100 according to an embodiment of the present invention is shown. It is noted that, while described herein with regard to an H.323 network, the invention is equally applicable to any packet network, such as MGCP (Media Gateway Control Protocol), SIP (Session Initiation Protocol), SGCP (Simple Gateway Control Protocol), MEGACO and generally including, any voice or multimedia over IP scheme. Further, it is noted that, while described specifically in the context of voice packets, the present invention encompasses the use of any multimedia information, such as video, data, voice, or any combinations thereof.

The telecommunications system 100 includes a local area network (LAN) or packet network 101. Coupled to the LAN 101 may be a variety of H.323 terminals 102a, 102b, 104a, 104b, a multi-point control unit (MCU) 110, an H.323 gateway 106, an H.323 gatekeeper 108, an Accessing Busy Resources service 112 and a plurality of other devices such as personal computers (not shown).

The H.323 terminals 102a, 102b, 104a, 104b are in compliance with the H.323 Recommendation and may be implemented as IP telephony devices 104a, 104b or IP telephony applications 102a, 102b running on a personal computer. H.323 terminals/devices and equipment carry real-time voice, video and/or data. It should be noted that the H.323 Recommendation is an umbrella recommendation that provides for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

Thus, the H.323 terminals 102a, 102b, 104a, 104b support H.245 control signaling for negotiation of media channel usage, H.225.0 (Q.931-like) for call signaling and call setup, H.225.0 Registration, Admission, and Status (RAS), and RTP/RTCP for sequencing audio and video packets. The H.323 terminals 102a, 102b, 104a, 104b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

As will be described in greater detail below, the Accessing Busy Resources service 112 may be implemented as part of another device such as gatekeeper 108 or in a separate server on the LAN 101. The Accessing Busy Resources service 112 is adapted to receive subscription requests from clients for notification of when a busy resource is free, and to monitor network resources to determine their availability. Upon notification of a resource becoming free, the Accessing Busy Resources service 112 de-subscribes the client. The Accessing Busy Resources service 112 further can maintain priority levels for clients who desire to access a network resource, as well as handling multiple busy instances of given resources.

In addition, as will be described in greater detail below, the H.323 client endpoints include Access Request units 103a, 103b according to embodiments of the present invention. The Access Request units 103a, 103b interact with the Accessing Busy Resources service 112. In particular, the Access Request units 103a, 103b receive notification from the Access Busy Resources service when the resource is available.

Figure 2:
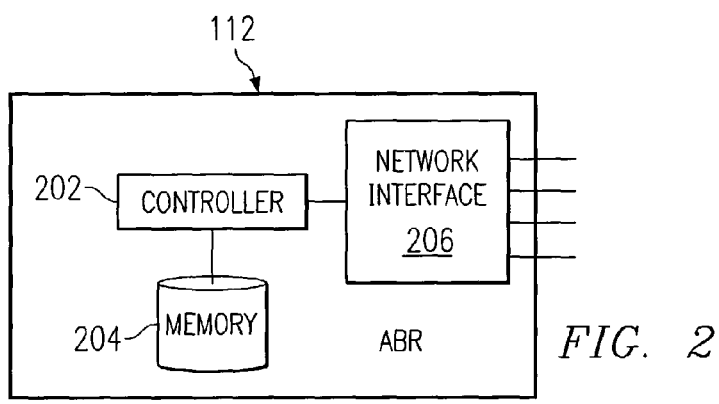
FIG. 2 is a block diagram of a presence server according to an embodiment of the present invention.

More particularly, turning now to FIG. 2, a block diagram of an exemplary Access Busy Resource service 112 is shown. As shown, the Access Busy Resource service 112 includes a controller 202, memory 204, and network interface 206. It is noted that while the Access Busy Resource service 112 may be implemented on a separate server, as shown, it also may be implemented as one or more software modules and associated memory on one of the network resources or servers. Thus, the figure is exemplary only.

As noted above, the network interface 206 may be implemented as an H.323 interface. The controller 202 may be implemented as any suitable processor or controller, or combinations thereof, such as a Pentium or Pentium type processor. The network interface 206 is an interface such as an H.323 Recommendation interface capable of signaling and call setup with the H.323 client endpoints. As will be discussed in greater detail below, Access Busy Resources service 112 is adapted to receive subscription requests from the H.323 client endpoints when a desired service is unavailable. The Access Busy Resources unit 112 then monitors the resource and advises the endpoint(s) when the service is available. The resource may, for example, send one or more signals to the Accessing Busy Resources service when this occurs. Moreover, the Accessing Busy Resources service can be notified when certain conditions are met, such as a number of MCU ports being free.

Figure 3:
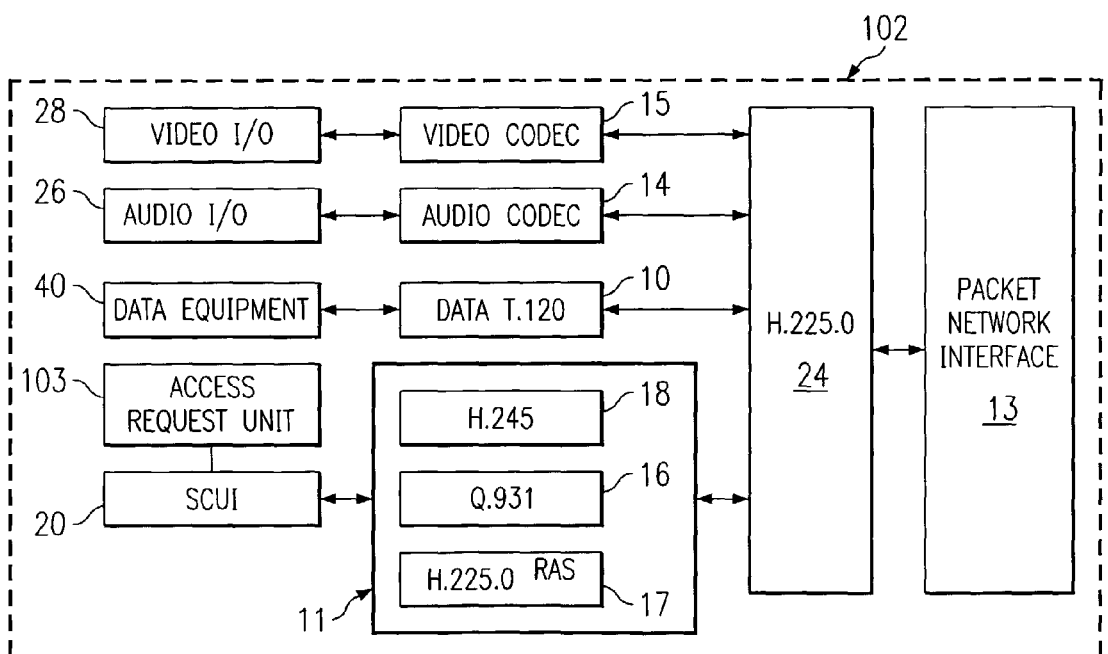
FIG. 3 is a block diagram of a telecommunications device according to an embodiment of the present invention.

Turning now to FIG. 3, a block diagram of an exemplary H.323 client endpoint according to embodiments of the present invention is shown. The interface includes a network terminal/device 102 or 104 including an access request unit 103 according to the present invention and a packet network interface 13 that is coupled to the network terminal 102. As will be discussed in greater detail below, the network terminal 102 utilizes the ITU-T H.323 Recommendation protocol. The network interface 13 couples the network terminal 102 to the LAN 101. The H.323 terminal 102 is coupled to a video input/output (I/O) interface 28, an audio I/O interface 26, a data equipment interface 40, and a system control user interface (SCUI) 20. The network terminal 102 further includes an H.225.0 layer 24, an audio coder/decoder (codec) 14, and may include a video codec 15, and a T.120 data interface layer 10. The audio I/O interface or card 26, which may be part of the standard H.323 device, connects to the audio codec 14, such as a G.711 codec, for encoding and decoding audio signals. The audio codec 14 is coupled to the H.225.0 layer 24. It encodes audio signals for transmission and decodes received signals. Although the G.711 codec is the mandatory audio codec for an H.323 terminal, other audio codecs, such as G.728, G.729, G.723.1, G.722, and MPEG1 audio may also be used for encoding and decoding speech. G.723.1 is a preferred codec because of its reasonably low bit rate, which enables preservation of link bandwidth, particularly in slower speed network connections.

The video I/O interface or card 28, which may be part of the standard H.323 device, connects to a video codec 15, such as an H.261 codec for encoding and decoding video signals. The video codec 15 encodes video signals for transmission and decodes received signals. H.261 is the mandatory codec for H.323 terminals that support video, though other codecs such as H.263 may be supported.

The system control user interface (SCUI) 20 provides signaling and flow control for proper operation of the H.323 terminal 102. In particular, call signaling and control are handled by the SCUI 20. The control layer 11 is a standard H.323 control layer and thus includes Q.931 layer 16, H.225.0 RAS layer 17, and H.245 layer 18. The H.245 layer 18 is the media control protocol that allows capability exchange, opening and closing of logical channels, mode preference requests, flow control messages and other miscellaneous commands and indications. The Q.931 protocol layer 16 defines the setup, teardown, and control of H.323 communication sessions. The H.225.0 Registration, Admission and Status (RAS) protocol layer 17 defines how H.323 entities can access H.323 gatekeepers to perform, among other things, address translation, thereby allowing H.323 endpoints to locate other H.323 endpoints via an H.323 gatekeeper. The H.225.0 layer 24, which is derived from Q.931 layer 16 is the protocol for establishing a connection among two or more terminals and also formats the transmitted video, audio, data, signaling and control streams into messages for communication via the network interface 13 (e.g., LAN 101). The H.225.0 layer 24 also retrieves the received video, audio, data, signaling and control streams from messages that have been input from the network interface, routes the signaling and control information to the control layer 11 and routes media streams to the appropriate audio, video and data interfaces.

The Access Request unit 103 may interface via the SCUI 20 to receive signaling indicative of whether one or more network resources are free. The Access Request unit 103 may then subscribe the user to the Access Busy Resources service 112. Subscriptions to the Access Busy Resources service can be automatic or can be invoked by the user. For example, a user could stay off hook on a call which would cause the Access Request unit to send a subscription request, as will be described in greater detail below. Alternatively, the user could invoke a "camp-on callback" request for subscribing and hang up the phone. The user would be called back when the resource was free. It is noted that the client can request access to more than one instance of the given resource (if the network is so equipped), and the Access Busy Resources service 112 will monitor each instance of the resource.

Turning now to FIGS. 4A-4D, signaling diagrams illustrating operation of embodiments of the present invention are shown. In particular, FIGS. 4A-4D illustrate signaling for subscribing to the Access Busy Resources service 112, according to embodiments of the present invention. Shown in each of FIGS. 4A-4D are an H.323 endpoint 102 or 104, a resource (such as resource 106, 108, 110), and the Access Busy Resources service 112.

Figure 4A:
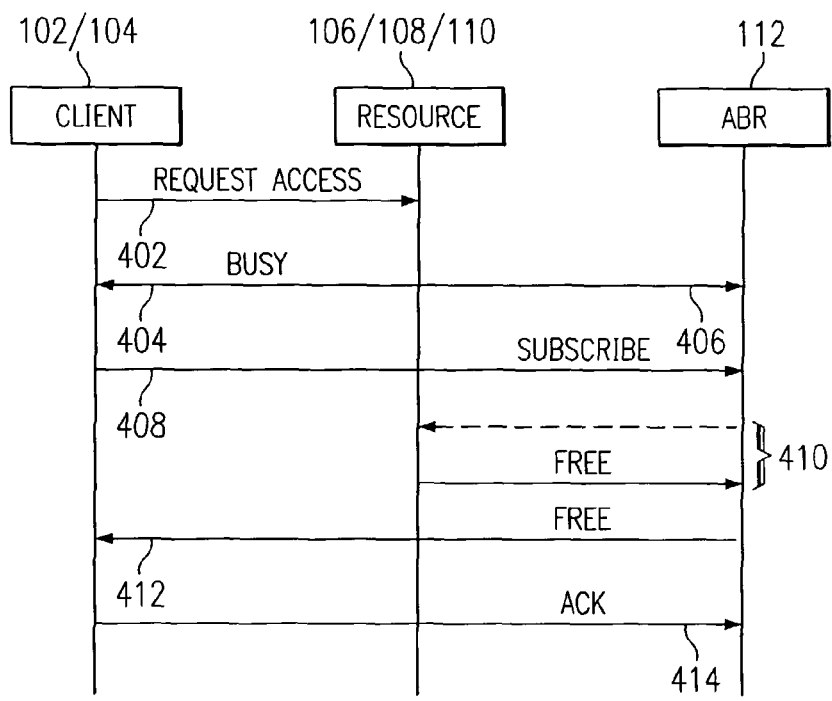
FIG. 4A-FIG. 4D are diagrams illustrating operation of an embodiment of the present invention.

Turning now to FIG. 4A, shown is an embodiment in which the Access Busy Resource service's address is known to the client endpoint 102/104. In this case, the client endpoint 102/104 can send a subscription directly to the Access Busy Resources service 112. For example, at 402, the client endpoint 102/104 requests access to a service 106/108/110. At 404, the resource responds that it is busy, and at 406 may also inform the Access Busy resources service. At 408, the client endpoint 102/104, knowing the address of the Access Busy Resources services, sends a subscription request. At 410, the Access Busy Resources service 112 monitors if the resource is free. It is noted that the Access Busy Resource database in memory will typically include information on multiple instances of a given resource. Thus, in response to the subscription, the monitoring may include determining if another instance of the resource is free. At 412, once the resource, or another instance of the resource, is free, the Access Busy Resource service 112 informs the client endpoint 102/104. At 414, the client endpoint 102/104 may respond with an acknowledgement and the subscription to the Access Busy Resource service is then terminated.

Figure 4B:
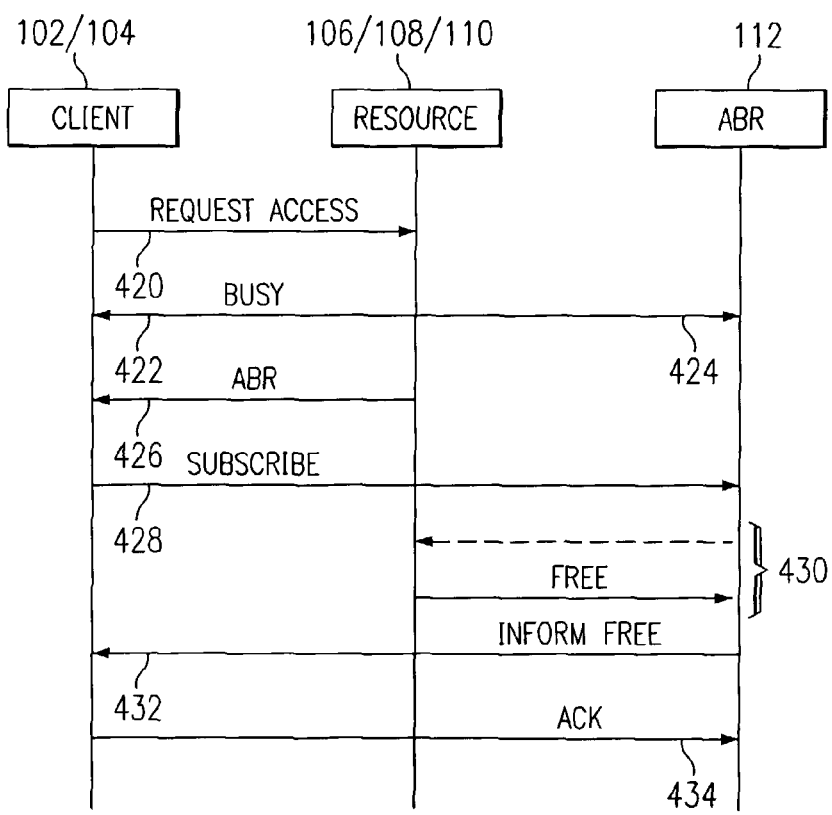

Shown in FIG. 4B is an embodiment in which the called busy resource sends the requester the address of the Access Busy Resources service. At 420, the client endpoint 102/104 requests access to the resource 106/108/110. At 422, the resource informs the client endpoint 102/104 it is busy and may also inform the Access Busy Resource service 112 at 424. At 426, the resource sends the client endpoint 102/104 the IP address of the Access Busy Resources service 112. At 428, the client endpoint 102/104, knowing the address of the Access Busy Resources service 112, sends a subscription request. At 430, the Access Busy Resources service 112 monitors if the resource, or another instance of the resource, is free. At 432, once the resource is free, the Access Busy Resource service informs the client endpoint 102/104. At 434, the client endpoint 102/104 may respond with an acknowledgement and the subscription to the Access Busy Resource service is then terminated.

Figure 4C:
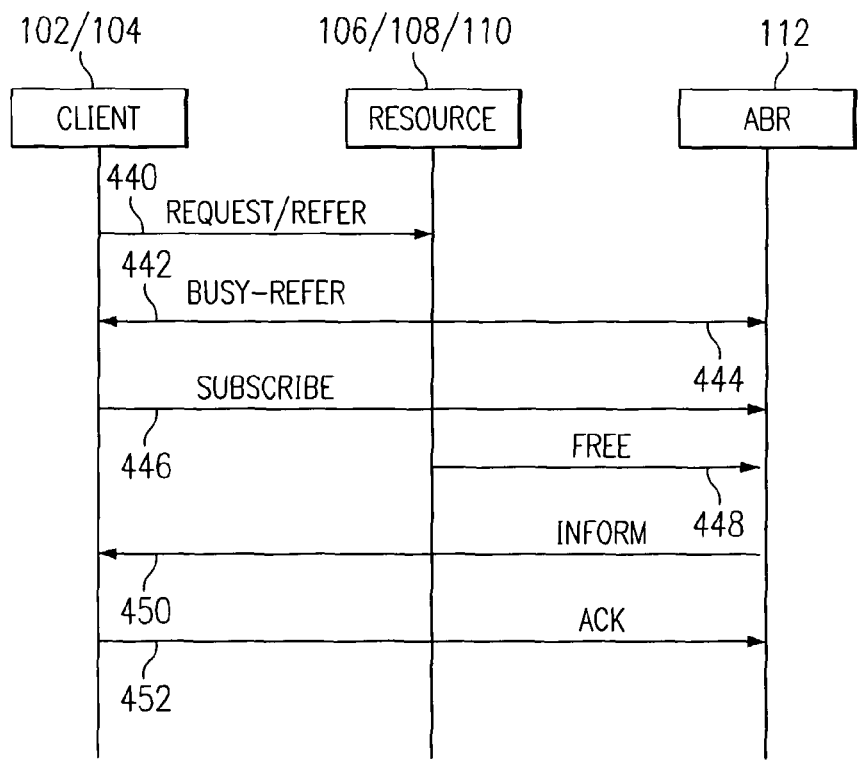

FIG. 4C illustrates signaling in an embodiment in which the requesting client can ask for a referral from a busy resource for the Access Busy Resource service. At 440, the client endpoint 102/104 sends a request to access the resource 106/108/110. Included in the request for access is a request for referral to an Access Busy Resource service if the resource is busy. At 442, the resource 106/108/110 informs the client endpoint that it is busy; included in the busy message can be, if requested and if available, an indication of the address of the Access Busy Resources service. At 444, the resource may also inform the Access Busy Resources service that it is busy. At 446, the client endpoint 102/104, knowing the address of the Access Busy Resources services, sends a subscription request. At 448, the Access Busy Resources service monitors if the resource, or another instance of the resource, is free. At 450, once the resource is free, the Access Busy Resource service informs the client endpoint 102/104. At 452, the client endpoint may respond with an acknowledgement and the subscription to the Access Busy Resource service is then terminated.

Figure 4D:
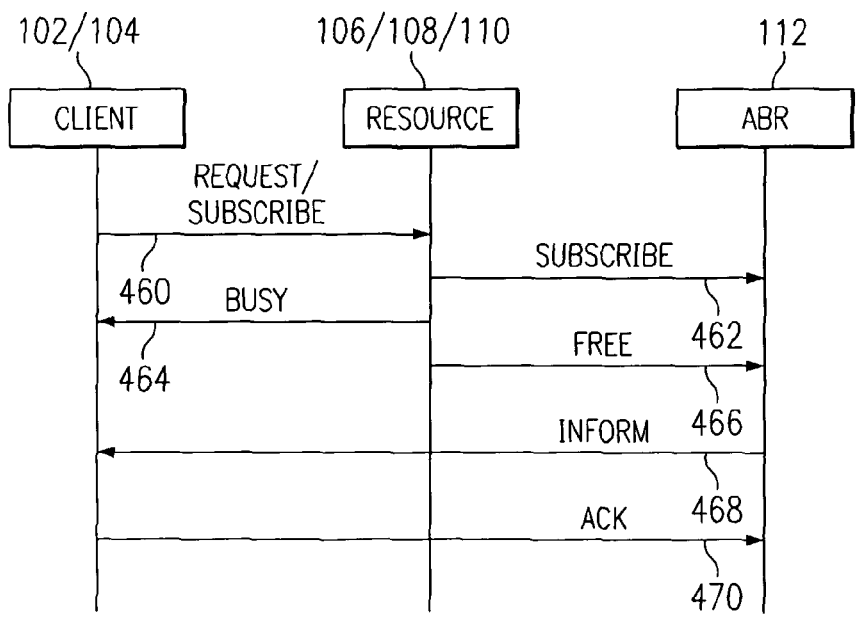

FIG. 4D illustrates signaling for an embodiment in which the busy resource subscribes the requesting endpoint automatically, once it receives the request and is busy. Thus, in 460, the client endpoint 102/104 requests access to the network resource 106/108/110 and includes in the request a request to be subscribed to an Access Busy Resources service should the resource be busy. At 462, the resource subscribes the client to the Access Busy Resources service 112 and, at 464, informs the client endpoint 102/104 it is busy and has subscribed the client endpoint to the Access Busy Resources service. At 466, the Access Busy Resource service 112 monitors the resource, or another instance of the resource, and determines when it is free. At 468, the Access Busy Resources service 112 informs the client endpoint that the subscribed resource is free. An acknowledgement may be received from the client at 470, and the subscription to the Access Busy Resource service is then terminated.

FIG. 5A-5D illustrate actions upon receiving acknowledgement from the Access Busy Resources service according to an embodiment of the present invention. FIG. 5A illustrates an action taken by an IP application, such as an application residing on computer 102a, 102b. At 502, the IP application attempts access to the resource, once the acknowledgement has been received.

FIGS. 5B-5D illustrate actions on an IP device 104a, 104b. FIG. 5B illustrates an embodiment in which the IP device 104 prompts the user at 504 for an action to be taken. The user can request access to the resource, at 506a, or can do nothing at 506b. In FIG. 5C, the IP device 104 can auto-connect the user, at 508. Finally, in FIG. 5D, the IP device 104 can have information that the resource is no longer needed, and thus ignore the acknowledgement, at 510. It is noted that in certain embodiments, the IP device and applications can also cancel a monitoring request at any time while the request is pending.

FIG. 6 illustrates an exemplary subscription request message 600 sent to the Access Busy Resources service to subscribe. Included are a subscriber identification field 602, a resource identification field 604, and optional priority 606, expiration 608, subscriber conditions 610, and service conditions fields 612. The subscriber identification field 602 provides the IP address or other identification of the subscriber. The resource identification field provides similar information regarding the resource desired to be accessed.

The priority 606, expiration 608, subscriber conditions 610, and service conditions fields 612 may provide conditions for the request. The priority field 606 allows the subscribing party to set a priority value. Alternatively, such priorities may be set by the system automatically. For example, application calls may be given priority over IP device calls or a priority may be given to subscribers who have waited the longest.

The expiration field 608 provides a time out on the subscription request. This ensures that the subscription does not persist indefinitely. The subscriber set conditions field 610 allows the subscriber to set conditions on the resource being monitored. For example, if the resource is an MCU, then the subscriber could set the number of ports required. The service set conditions field 612 allows coordination with other services which may control the resource being requested. For example, in addition to requesting a free trunk at a gateway or a free port on an MCU, the client endpoint may also request that compressed codec interworking be supported by the gateway or MCU.

If there is no priority scheme in place for monitoring a resource, then all clients monitoring that resource will be notified simultaneously when the resource becomes free. If there is a priority scheme in place, then the highest priority party or parties will be notified first that the resource is free. If the resource remains free after a configurable period, then the Access Busy Resources service 112 will assume that the prior notified parties no longer wish to use the service and will notify the next highest priority party or parties.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications system, comprising:
   a network;
   a plurality of network clients;
   a plurality of network resources shared by the network clients, the network resources including at least one of a trunk or a server port, conferencing or MCU channels, gateway channels, media-on-hold ports, IVR ports, unified messaging ports, recorded announcements, recording ports, DTMF detection ports, call parking slots, or pilot numbers to applications, wherein at least one of said network clients includes an access request unit that is configured to send an access request message to at least one of the network resources, wherein the network resource sends the network client a busy message if the network resource is busy; and
   an Accessing Busy Resources (ABR) service, wherein said access request message includes a request for a referral to the ABR service if the network resource is busy, wherein said busy message includes an address of the ABR service, wherein said access request unit can subscribe, using the address, to said ABR service responsive to receiving the busy message and be informed by said ABR service when said shared network resource is available,
   wherein said access request unit is configured to specify one or more conditions required of said network resource when subscribing, by sending a subscription request message including at least one conditions field,
   wherein said ABR service de-subscribes the network client responsive to the shared network resource being available.

2. The telecommunications system of claim 1,
   wherein said ABR service is configured to maintain a priority for accessing a particular network resource among subscribed network clients.

3. The telecommunications system of claim 1,
   wherein said ABR service is configured to maintain a monitoring session to monitor more than one instance of a same kind of the network resource responsive to said subscription and to inform said network clients if another instance of the same kind of the network resource is available for use by the network clients.

4. The telecommunications system in accordance with claim 2,
   wherein said ABR service is configured to provide a notification to a next priority user if a first priority user has not responded to a notification within a predetermined period.

5. A telecommunications method, comprising:
   providing a network;
   providing a plurality of network clients;
   providing a plurality of network resources shared by the network clients, the network resources including at least one of a trunk or a server port, conferencing or MCU channels, gateway channels, media-on-hold ports, IVR ports, unified messaging ports, recorded announcements, recording ports, DTMF detection ports, call parking slots, or pilot numbers to applications, wherein at least one of said plurality of network clients includes an access request unit that is configured to send an access request message to at least one of said plurality of network resources, wherein the network resource sends the network client a busy message it the network resource is busy;
   if the network resource is busy, sending, by the network resource, a busy message to the access request unit; and
   providing an Accessing Busy Resources (ABR) service, wherein said access request message includes a request for a referral to the ABR service if the network resource is busy, wherein said busy message includes an address of the ABR service, wherein said access request unit can subscribe, using the address, to said ABR service responsive to receiving the busy message and be informed by said ABR service when said shared network resource is available by sending a subscription request message to said ABR service,
   wherein said ABR service de-subscribes the network client responsive to the shared network resource being available.

6. The telecommunications method of claim 5,
   wherein said ABR service is configured to maintain a priority for accessing a particular network resource among subscribed network clients.

* * * * *